United States Patent [19]
Taguchi et al.

[11] 3,820,124
[45] June 25, 1974

[54] ANTI-MISFUNCTION DEVICE FOR A SINGLE LENS REFLEX CAMERA

[75] Inventors: Tatsuya Taguchi, Tokyo; Yukio Iura, Yokosuka, both of Japan

[73] Assignee: Canon Kabushiki Kaisha, Tokyo, Japan

[22] Filed: Jan. 31, 1973

[21] Appl. No.: 328,411

[30] Foreign Application Priority Data
Feb. 8, 1972  Japan.............................. 47-13760

[52] U.S. Cl. .................354/23, 95/64 R, 95/64 B
[51] Int. Cl. ..................................... G03b 19/12
[58] Field of Search ................... 95/42, 64 B, 64 R

[56] References Cited
UNITED STATES PATENTS
3,643,572  2/1972  Kurei...................................... 95/42
3,714,878  2/1973  Hasegawa.............................. 95/42
3,747,485  7/1973  Suzuki................................. 95/42 X Primary Examiner—Richard M. Sheer
Assistant Examiner—E. M. Bero
Attorney, Agent, or Firm—Flynn & Frishauf

[57] ABSTRACT

In a single lens reflex camera interchangeably using two types of interchangeable lenses, i.e. for open photometry and for stopped-down photometry, and having an exposure determining device capable of measuring light by a system suited to each of the two types of lenses, a misfunction preventing device comprises a different discriminator member provided in each of the lenses and cooperable with manually operable aperture means to control release blocking means so that shutter release may be prevented when an inappropriate photometric operation has been effected.

5 Claims, 3 Drawing Figures

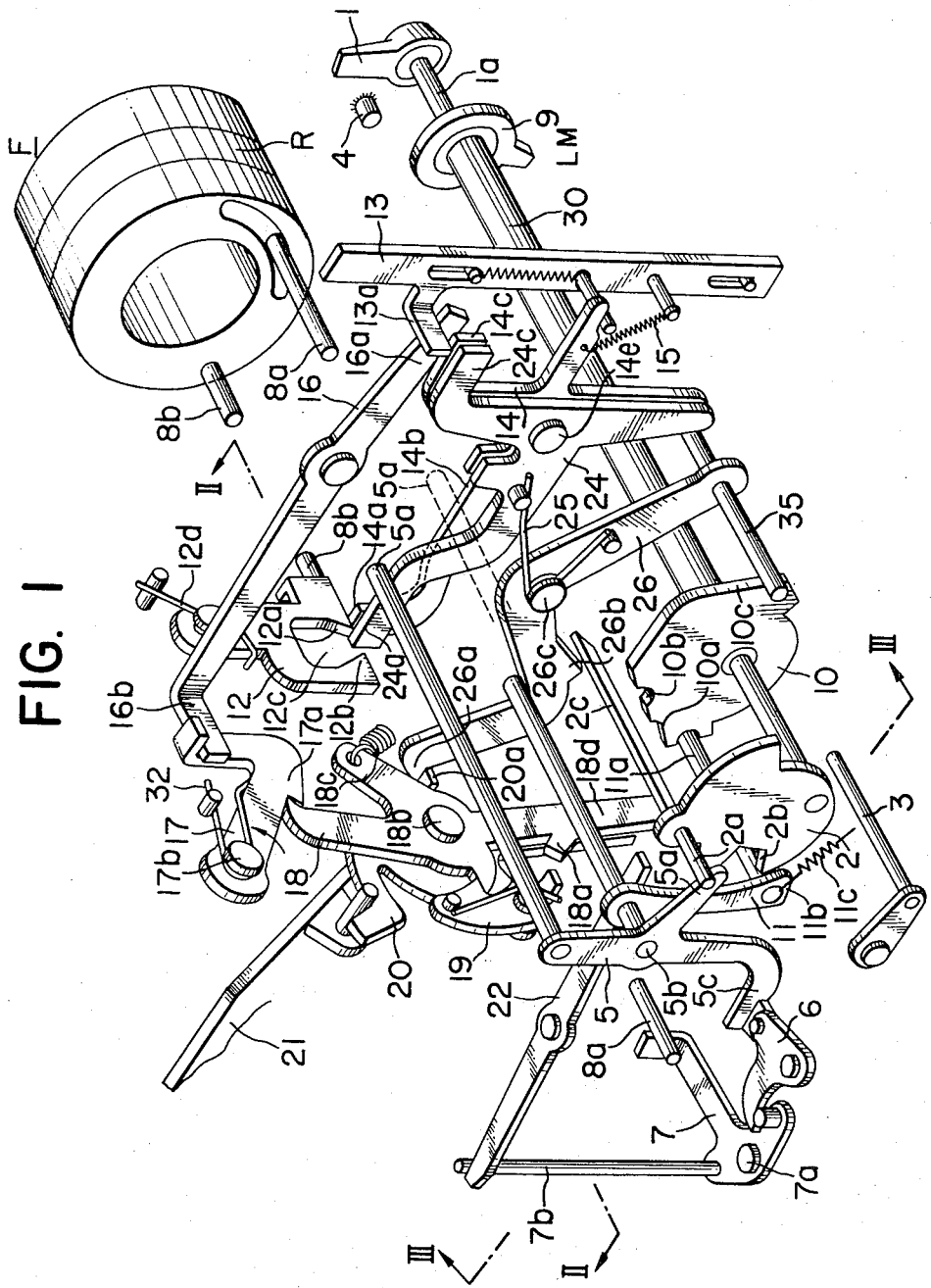
FIG. I

ANTI-MISFUNCTION DEVICE FOR A SINGLE LENS REFLEX CAMERA

BACKGROUND OF THE INVENTION

1. Field of the Invention

This invention relates to a single lens reflex camera, and more particularly to a anti-misfunction device in a camera having a so-called TTL exposure meter or exposure determining device which includes a light-receiving element provided behind a photographic lens to measure the light from an object that has passed through the lens, to thereby determine the exposure.

2. Description of the Prior Art

Single lens reflex cameras generally employ various interchangeable lenses of different focal distances and different open aperture ratios, as is well known. The single lens reflex cameras using TTL photometry are grouped into two types, one of which utilizes the so-called open photometric system whereby light is measured through an open (fully open) aperture and the other type utilizes the so-called stopped-down photometric system whereby light is measured with the lens aperture actually stopped down. Therefore, the interchangeable lenses usable with the cameras of the open photometric system have an aperture signal member for transmitting a preset value of aperture to the exposure meter or exposure determining device of the camera, whereas the interchangeable lenses for use with the cameras of the stopped-down photometric system have no such aperture signal member.

There are also known cameras which can employ both the lenses for open photometry and the lenses for stopped-down photometry and which can measure the light by a system suited to each of the lenses. In such cameras, if stopped-down photometry should be effected by mistake with a lens for open photometry, the exposure meter or the exposure determining device would be dually affected by the aperture value. On the other hand, if the photometry is effected by mistake with the aperture fully open during the use of a lens for stopped-down photometry, the exposure value would be determined without the aperture being considered. Thus, either of these two cases would fail to provide a correct exposure.

Means is known which provides an alarm by means of a meter needle or a lamp within the viewfinder of the camera when the wrong operation as described is in effect.

SUMMARY OF THE INVENTION

The present invention intends to positively prevent the above-described misfunction by inhibiting depression of a shutter release rod. To this end, the present invention provides a lens for open photometry and a lens for stopped-down photometry with different discriminator members, by which a shutter release blocking means provided in a camera may be operated.

BRIEF DESCRIPTION OF THE DRAWINGS

The invention will more fully be described with respect to some specific embodiments thereof as shown in the accompanying drawings, in which:

FIG. 1 is a schematic perspective view of the device according to the present invention;

DESCRIPTION OF THE PREFERRED EMBODIMENTS

Figures 2, 3:
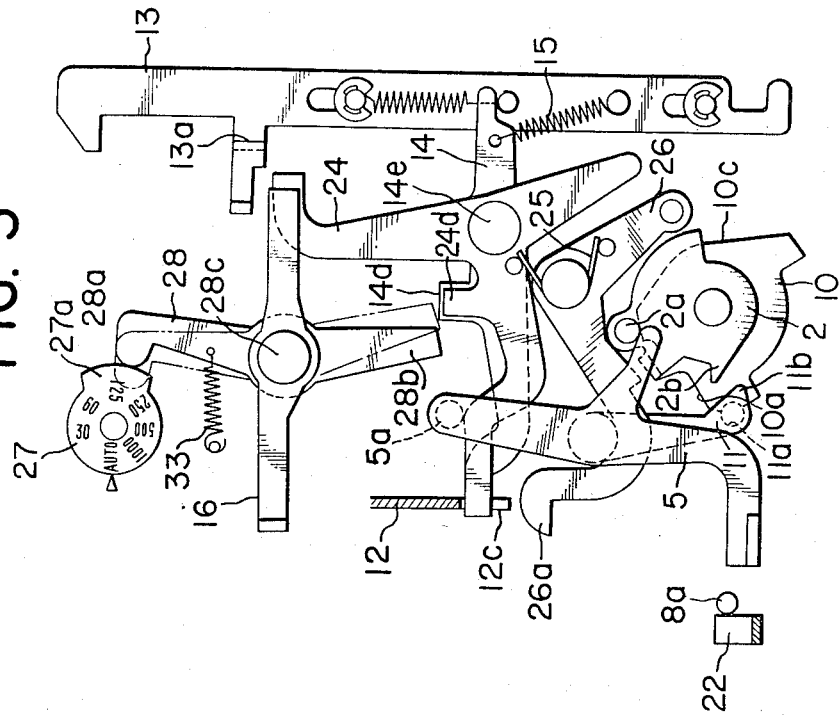
FIG. 2 is a view taken along line II—II of FIG. 1.
FIG. 3 is a view taken along lines III—III of FIG. 1.

Referring to FIG. 1, F generally designates an interchangeable lens for open photometry having an unshown aperture signal member which is movable in response to the rotation of a preset ring R to transmit a preset value of aperture to an exposure determining device provided in a camera. The interchangeable lens F is provided with a pin 8a adapted to engage an aperture drive member 7 provided in the camera to stop down the aperture to the preset value, and a discriminator pin 8b projected rearwardly from the rear end of the lens barrel.

With regard to the camera, a manually operable aperture lever 1 is provided in the front of the camera and rotatably mounted on a shaft 1a at one end thereof. Clockwise rotation of the lever 1 from its shown position will cause clockwise rotation of a cam plate 2 secured to the shaft 1a at the other end thereof, which will in turn rotate a charge pin 3 for a self-timer (not shown) to charge the latter. Anti-clockwise rotation of the lever 1 until stopped by a stop 4 will also cause anti-clockwise rotation of the cam plate 2 so that a pin 2a provided thereon will be engaged with an arm 5a of a stop-down lever 5 to thereby rotate the lever 5 about its shaft 5b, which will in turn actuate a pivotable lever 6 in engagement with another arm 5c of the lever 5 to rotate the aperture drive lever 7 clockwise about its shaft 7a, thus driving the said pin 8a of the lens F to stop down the lens aperture to a preset value.

An aperture lock knob 9 is securely mounted on one end of a cylindrical shaft 30 loosely fitted over the shaft 1a. When the knob 9 is rotated clockwise from its shown position to a position L in FIG. 1 with the above-described stopped down position maintained, a clutch plate 10 secured to the other end of the cylindrical shaft 30 will be rotated in the same direction to cause a pin 11a on a lock lever 11 loosely fitted on the shaft 5b to be pulled by a spring 11c until the pin 11a is received in a deep recess 10a formed in the clutch plate 10, whereupon the tip end 11b of the lock lever 11 will be engaged with the pawl 2b of the cam plate 2 to lock the latter, thus holding the aperture in its stopped-down condition.

To restore the open (fully-open) condition of the aperture, the knob 9 may be rotated clockwise to its shown position to return the clutch plate 10 to its original position and force the pin 11a out of the recess 10a, with the tip end 11b of the block lever 11 releasing its engagement with the pawl 2b to permit the cam plate 2 to be returned to its shown position by the force of an unshown spring, thus releasing the stop-down lever 5 to thereby restore the open condition of the aperture.

Description will now be made of the manner in which open photometry is effected with the lens for open photometry mounted to the camera.

When the lens is mounted to the camera, the discriminator pin 8b is engaged with a displacement lever 12 of horse-shoe shape pivotally connected to the camera body, as shown in FIG. 1, to thereby rotate the lever 12 clockwise against the force of a spring 12d until the pawl 12a of the lever 12 is displaced into the rotational locus of a blocking lever 14 (to be described) as indicated by a solid line in FIG. 2. The lever 1 is then in its erect or upright position as shown in FIG. 1, with the aperture maintained in fully open condition.

If the camera in such position is made to look toward an object, light reflected from the object will pass through the fully open aperture into a light-receiving element provided within the camera. The preset ring R is then rotated to set the aperture to a desired value, in response to which an unshown signal member will transmit the value of the aperture to an exposure determining device within the camera, thus automatically setting up a shutter speed corresponding to the brightness of the object and to the aperture.

Subsequently, a release rod 13 is depressed. In the first stroke of such depression, a first blocking lever 14 pivotally connected to the camera body is biased clockwise by a spring 15 but it is not rotatable because one end 14a thereof is engaged by a pawl 12a of the displacement lever 12, so that the release rod 13 can shift to its next stroke without being blocked by the blocking lever 14. In the second stroke, the bend 13a of the release rod 13 actuates one end 16a of a release lever 16 to rotate this lever, while the other end 16b thereof rotates a retaining lever 17 about its shaft 17 in the direction of arrow against the force of a spring 32, thereby releasing a main lever 18 from the retention of the pawl 17a of the lever 17.

The main lever 18 is forcibly rotated clockwise about its shaft 18b by a spring 18c, while a mirror kick-up lever 20 provided on the shaft 18b is rotated with the lever 18 by means of a hook 19 pivotally mounted on the lever 20, thus kicking up a viewfinder mirror 21 out of the photographic optical path.

Simultaneously therewith, an arm 18d of the main lever 18 kicks a lever 22, which in turn kicks a pin 7b on the aperture drive lever 7 to displace the pin 8a of the lens, thus stopping down the aperture to a preset value.

An arm 18a of the lever 18 actuates a start lever 23 (FIG. 2) to start a camera shutter for exposure.

In the case described above, picture-taking operation is possible only when the first and second strokes of the depression of the release rod 13 have taken place.

Description will now be made of the case where with the same lens mounted, a stopped-down photometry operation is effected by mistake, i.e. by operating the manually operable aperture lever 1.

When the lever 1 is rotated anti-clockwise from its shown position till stopped by the stop 4, the pin 2a of the cam plate 2 is caused to rotate the stop-down lever 5 to stop down the lens to the preset value, as described previously. Simultaneously therewith, the pin 5a on the lever 5 is displaced to its position as indicated by dotted lines in FIG. 1, thus releasing its engagement with the shoulder 24a of a second blocking lever 24. Since the displacement lever 12 is then assuming the solid-line position of FIG. 2 as described previously, the second blocking lever 24 is rotated clockwise about a shaft 14e by the force of a spring 25 so that the bend 24c of the lever 24 juts into the path of the bend 13a of the release rod 13.

Therefore, when the release rod 13 is depressed, this rod is moved over its first stroke and then the bend 13a thereof is engaged with the bend 24c of the blocking lever 24 so that the rod 13 is blocked against the shift into its second stroke, thus preventing occurrence of any shutter release and accordingly any erroneous exposure.

The use of a lens for stopped-down photometry, i.e. a lens having no aperture signal member, will be described hereinafter.

An interchangeable lens of this type either has a discriminator pin 8b shorter than that of the above-described lens for open photometry or has no such pin at all, either of these conditions being here defined as a discriminator feature of the lens. Therefore, when such lens is mounted to a camera, the said displacement lever 12 of the camera is urged against the stop 12e by the spring 12d and held stationary in the position as indicated by dots-and-dash line in FIG. 2. As a result, the pawl 12a of the lever 12 is out of the locus of the first blocking lever 14 while the other pawl 12b of the lever 12 lies in the locus of the second blocking lever 24.

When the manually operable aperture lever 1 is rotated anti-clockwise to stop down the lens, the pin 5a of the stop-down lever 5 is displaced to the position as indicated by dotted lines in FIG. 1, thereby striking the shoulder 14b of the first blocking lever 14 and blocking its rotation. Thus, when the release rod 13 has been depressed, the bends 14c and 24c of the blocking levers 14 and 24 are both out of the path of the bend 13a of the release rod 13, whereby the rod 13 is permitted to shift from its first to its second stroke without being blocked, thereby operating the shutter.

In this case, the light from an object passes through the aperture opening stopped down to a desired value and reaches the light-receiving element of the exposure determining device, which thus automatically determines a shutter speed corresponding to the brightness of the object and the value of the aperture to thereby accomplish a proper exposure.

Next, description will be made of the case where with the same lens used, the release rod 13 is depressed in the fully-open aperture condition, i.e. without the manually operable aperture lever 1 being operated. The stop-down lever 5 lies in its solid-line position of FIG. 1 where it is retaining the second blocking lever 24, but the discriminator lever 12 lies in its dots-and-dash line position of FIG. 2 where it is not retaining the first blocking lever 14. Therefore, the blocking lever 14 is forcibly rotated clockwise by the spring 15 so that the bend 14c thereof blocks the shift of the release rod 13 to its second stroke. Thus, the shutter cannot be operated and any erroneous exposure may be prevented from occurring.

The lock knob 9 may also be utilized for the purpose of manually pre-retracting the viewfinder mirror out of the photographic optical path prior to mounting a lens of short focal distance or prior to taking a microphotograph.

During ordinary photography, it is seen from the foregoing description that the release rod is depressed to operate the aperture and the viewfinder mirror substantially at a time, and in the kicked-up position of the mirror or just prior to the shutter operation, the aperture has been completely stopped down to its preset value with the aperture blades maintained stationary. In contrast, when the view-finder mirror has been manually pre-retracted, the shutter will be operated to provide an incorrect exposure before the aperture blades have completed their operation. In order to overcome such disadvantage, the device of the present invention is designed such that the mirror cannot be manually actuated unless the aperture is manually stopped down to a preset value. This may be achieved by the operation described hereinafter.

The manually operable aperture lever 1 is rotated anti-clockwise until it strikes the stop 4, whereupon the lock knob 9 is rotated to the position "M" in the same direction, whereby the clutch plate 10 is rotated to receive the pin 11a of the lock lever 11 in the recess 10b thereof. By means of the camming surface 10c of the clutch plate 10, an intermediate lever 26 is rotated anti-clockwise about its shaft 26c so that its end portion 26a actuates the projection 20a of the mirror kick-up lever 20 to kick up the view finder mirror out of the photographic optical path without operating the shutter.

The intermediate lever 26 has a projection 26b opposed to the arm 2c projected from the cam plate 2. When the manually operable aperture lever 1 is not operated and the arm 2c stays in the position of FIG. 1, the projection 26b of the lever 26 is bearing against the arm 2c, which thus blocks the rotation of the lever 26 and accordingly prevents it from kicking up the mirror 21.

With such construction, the mirror kick-up and stop-down operations may be manually accomplished prior to a picture-taking operation to thereby reduce greatly the noise produced in the camera during picture-taking, and this may be effectively utilized for taking pictures in those environments where muted operation or noiselessness is imperative.

The resetting of the mirror and aperture may be accomplished by rotating the knob 9 and aperture lever 1 clockwise back to their positions as shown in FIG. 1.

In cases where the viewfinder mirror is kicked up in advance as described or where the shutter speed is manually set up for some other purpose, the anti-misfunction device would sometimes be cumbersome to the user. In view of these cases, the device is designed so that the blocking levers 14 and 24 may be retained by rotating a shutter dial within the range of manual rotation.

This feature of the present invention is particularly shown in FIG. 3, which includes a shutter dial 27, a cam 27a integral therewith, and a retaining lever 28 provided between the cam 27a and the blocking levers 14, 24.

When the shutter dial 27 is set to the "AUTO" position, one end 28a of the lever 28 is actuated by the cam 27a to rotate the lever 28 clockwise about its shaft 28a. An arm 28b of the lever 28 opposed to the blocking levers is in a position for permitting rotation of the projections 14d, 24d of the blocking levers. When the shutter dial is rotated within the manually adjustable range of shutter speed (in FIG. 3, 30 to 1,000), the lever 28 is forcibly rotated anti-clockwise by a spring 33 so that the arm 28b thereof comes to retain the projections 14d, 24d of the blocking levers, as indicated by dots-and-dash lines, thus permitting free depression of the release rod 13.

It will thus be appreciated that the above-described construction of the present invention inhibits any shutter release and positively prevents any erroneous picture-taking when a lens for open photometry and a lens for stopped-down photometry are interchanged with each other to confuse the photographer enough to attempt a stopped-down photometry operation on the lens for open photometry or an open photometry operation on the lens for stopped-down photometry. In addition, the present invention enables various operations such as manual photography, mirror kick-up, etc. to be carried out by a simple manipulation.

We claim:

1. In a single lens reflex camera with interchangeable lenses of a type having discriminator features for indicating by the configuration thereof whether exposure is to be determined by the open photometric system or by the stopped-down photometric system, said lenses also having manually operable aperture means and, a manually operated shutter control, an anti-misfunction device in said camera comprising in combination:

a displacement member in the camera displaceable in response to the configuration of the discriminator feature of a lens of said type mounted on said camera;

a camera release member; and release blocking means arranged for movement from a position for permitting movement of said release member to a position for blocking such movement when said displacement member is displaced in accordance with the discriminator feature of a lens requiring stop-down photometry prior to completion of a manual stop-down operation.

2. A device according to claim 1, wherein said displacement member is arranged to respond to the discriminator feature of a lens for open photometry mounted to the camera, so as to inhibit said blocking means and to permit movement of said camera release member only when the manual stopdown lever is not operated, and is arranged to respond to the discriminator feature of a lens for stopped-down photometry so as to cause said blocking means to permit movement of said camera release member only when the manual stop-down lever is operated.

3. A device according to claim 1, further comprising a retaining member responsive to a manual shutter control for inhibiting the blocking operation of said blocking means and thereby assuring freedom of said release means except when said shutter is manually set for automatic control.

4. A device according to claim 1, wherein said release blocking means comprises first and second blocking members, the first blocking member is inhibited from blocking by said displacement member when a lens for open photometry is mounted and the second blocking member is inhibited from blocking by said manually operable aperture means being in its non-operated position when a lens for open photometry is mounted, and the first blocking member is inhibited from blocking by said manually operable aperture means being in its non-operated position when a lens for stopped-down photometry is mounted and the second blocking member is inhibited from blocking by said displacement member when a lens for stopped-down photometry is mounted.

5. A device according to claim 1, wherein said release blocking means comprises first and second blocking members controlled by said displacement member and by said manually operated aperture means in accordance with the following truth table:

| Lens | O.P. lens | | S.D.P. lens | |
|---|---|---|---|---|
| Condition of { Manual aperture means | Op'd | Non-op'd | Op'd | Non-op'd. |
| 1st blocking mmbr | I(D) | I(D) | I(A) | B(A). |
| 2d blocking mmbr | B(A) | I(A) | I(D) | I(D). |

NOTES:
I = inhibited from blocking,
B = blocks,
(D) = control by displacement member,
(A) = control by manually operated aperture means,
O.P. = open photometry,
S.D.P. = stop-down photometry,
Op'd = operated,
Non-op'd = non-operated.

\* \* \* \* \*